United States Patent
Simonov et al.

(10) Patent No.: US 7,857,722 B2
(45) Date of Patent: Dec. 28, 2010

(54) PLATE-LINK CHAIN FOR A MOTOR VEHICLE DRIVE SYSTEM

(75) Inventors: Anton Simonov, Bühl (DE); Martin Vornehm, Bühl (DE); Michael Pichura, Bühl (DE); Marcus Junig, Bühlertal (DE); Olga Ispolatova, Bühl (DE); Christoph Mayerhofer, Ottersweier (DE)

(73) Assignee: LuK Lamellen und Kupplungsbau Beteiligungs KG, Böhl (DE)

( * ) Notice: Subject to any disclaimer, the term of this patent is extended or adjusted under 35 U.S.C. 154(b) by 119 days.

(21) Appl. No.: 11/645,087

(22) Filed: Dec. 21, 2006

(65) Prior Publication Data

US 2007/0197329 A1    Aug. 23, 2007

Related U.S. Application Data

(60) Provisional application No. 60/752,703, filed on Dec. 21, 2005.

(51) Int. Cl.
*F16G 13/04* (2006.01)
(52) U.S. Cl. ..................................... 474/215
(58) Field of Classification Search ................ 474/215
See application file for complete search history.

(56) References Cited

U.S. PATENT DOCUMENTS 1,563,065 A * 11/1925 Belcher ...................... 474/215
1,678,450 A * 7/1928 Sturtevant ................... 474/216
1,743,500 A * 1/1930 Sturtevant ................... 474/215
2,725,755 A   12/1955 Riopelle et al. ............. 474/157
4,130,026 A   12/1978 Jeffrey ....................... 474/215
4,708,701 A   11/1987 Cole, Jr. .................... 474/245
5,651,746 A *  7/1997 Okuda ........................ 474/215
6,494,800 B1* 12/2002 Kanehira et al. ........... 474/215
2004/0110591 A1* 6/2004 Kotera ........................ 474/213
2006/0058142 A1* 3/2006 Hasebe et al. .............. 474/215
2007/0010363 A1  1/2007 Pichura et al. .............. 474/215

FOREIGN PATENT DOCUMENTS

EP   0 967 410 A1   12/1999
FR   2 371 611      6/1978
WO   WO 2006/058529 A1   6/2006

* cited by examiner

*Primary Examiner*—Michael R Mansen
*Assistant Examiner*—Robert T Reese
(74) *Attorney, Agent, or Firm*—Alfred J. Mangels

(57) ABSTRACT

A plate-link chain for a motor vehicle drive system. The chain includes a number of link plates hingedly connected with each other by rocker members that extend transversely to the longitudinal direction of the plate-link chain and are positioned in openings of the link plates. Curved-shaped contact surfaces are located on each of the rocker members and link plates, along which contact surfaces the rocker members and link plates are in contact with each other to transmit power. The rocker members are shaped asymmetrically in the height direction of the rocker members, relative to a cross section extending in the longitudinal direction of the plate-link chain. The link plate openings include at least one region that is curved in an inward direction, to prevent incorrect orientation of the rocker members during assembly of the chain.

11 Claims, 2 Drawing Sheets

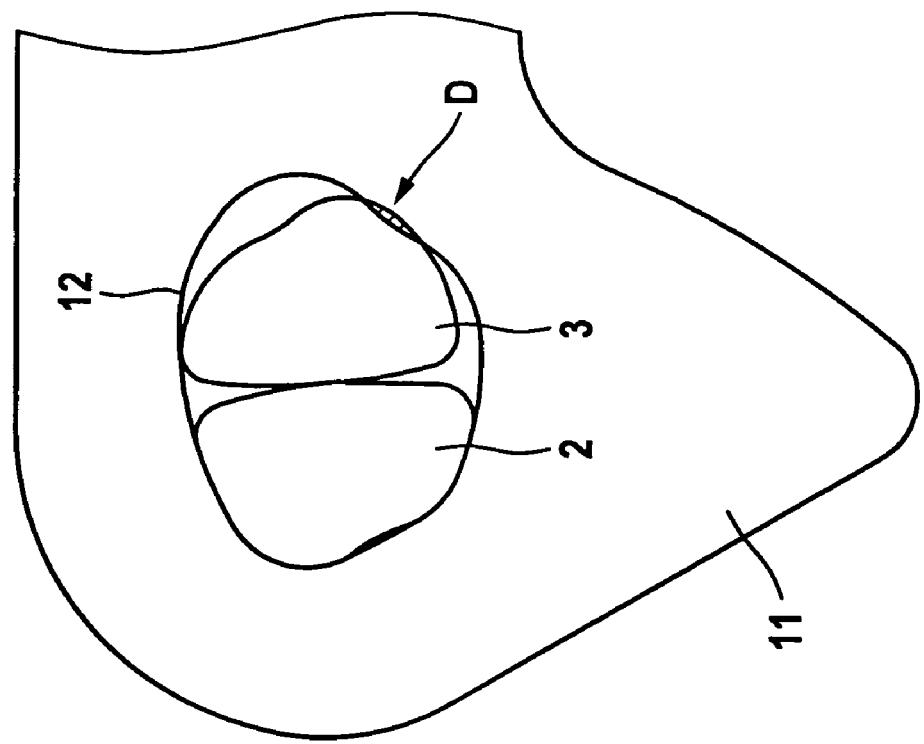
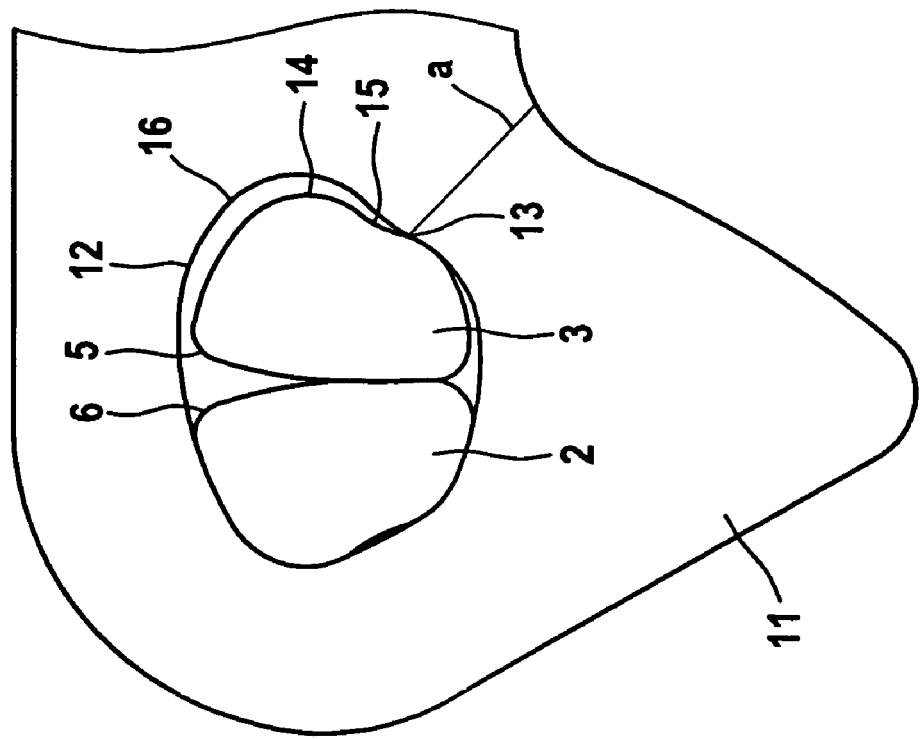

PLATE-LINK CHAIN FOR A MOTOR VEHICLE DRIVE SYSTEM

BACKGROUND OF THE INVENTION

1. Field of the Invention

The present invention relates to a plate-link chain, in particular a chain for a motor vehicle drive system. The link plates are configured in such a way as to prevent incorrect assembly of the chain.

2. Description of the Related Art

Known motor vehicle drive chains include a large number of link plates that are hingedly connected with each other by rocker members that extend transversely to the longitudinal direction of the plate-link chain. The rocker members are positioned in openings provided in the link plates. There are curved-shaped contact surfaces located on the rocker members and on the link plates, along which contact surfaces the rocker members and link plates are in contact with each other to transmit power. The rocker members also include curved-shaped rolling surfaces, along which the rocker members roll on each other to transmit power. The rocker members are shaped asymmetrically in the height direction of the rocker members, in a cross section extending in the longitudinal direction of the plate-link chain, and the contact surfaces between rocker member and link plate are provided on upper and lower contact surface regions in the height direction of the rocker member.

Such a plate-link chain can be a toothed chain, which can be installed in a power divider transmission of a motor vehicle, for example, or as a drive chain for an auxiliary unit of an internal combustion engine of the motor vehicle. In those cases the plate-link chain is designed as a toothed chain, and transmits tractive force between a driving and a driven sprocket wheel. However, a plate-link chain such as the type identified at the outset can also be installed as a means of transmitting tractive force in a belt-driven conical-pulley transmission, or the like, for example, and can there transmit the tractive force by means of frictional contact between the rocker members and the conical disk surfaces of the two conical disk pairs.

In previously known plate-link chains, symmetrical pressure pieces—also called rocker pressure pieces—were used, which were positioned in openings in the link plates. Those known rocker members are symmetrical about a plane of symmetry that divides the rocker members into upper and lower halves. As a result of that configuration, a distance from the inner peripheral edge of the opening receiving the rocker members to an outer peripheral edge of the link plate, in the region of the lower bow lying opposite an upper bow of the link plate, becomes minimal, and thus the cross sectional area available for transmitting power becomes minimal. That design therefore results in a concentration of stress in that region between the opening of the link plate and the edge of the link plate, which reduces the service life and the transmitting capacity of the link plate, and thus of the entire plate-link chain.

To counter that problem, a plate-link chain has already become known on the basis of unpublished German patent application DE 10 2005 054 714.1, owned by the assignee of the present application. That chain has asymmetrical rocker members in the direction of the rocker member height, and it thereby ensures that the working part stresses that arise between rocker member and link plate in the upper and lower contact surface regions are significantly reduced, so that the service life of the plate-link chain increases.

Those asymmetrical rocker members are also inserted into openings of the link plates, which must be done in such a manner that the rolling surfaces of the rocker members are associated with each other. Furthermore, the asymmetrical rocker members must be inserted into the openings with their positions oriented so that the openings are broader-shaped in the regions corresponding to the broader upper parts of the rocker members. As already mentioned earlier, care must be taken to ensure that the asymmetrical rocker members are inserted into the openings in the link plates with their positions properly oriented with respect to each other.

Accordingly, an object of the present invention is to improve the plate-link chain so that a situation where the rocker members are installed incorrectly in the link plates is not possible.

SUMMARY OF THE INVENTION

To achieve that object, the present invention therefore provides an improved plate-link chain, in particular for a motor vehicle drive system. The chain includes a large number of link plates hingedly connected with each other by rocker members, wherein the rocker members extend transversely to the longitudinal direction of the plate-link chain and are positioned in openings of the link plates. Curved-shaped contact surfaces are located on each of the rocker members and link plates, along which contact surfaces the rocker members and link plates are in contact with each other to transmit power. Curved-shaped rolling surfaces are also located on the rocker members, along which the rocker members roll on each other to transmit power. The rocker members are shaped asymmetrically in the height direction of the rocker members in a cross section extending in the longitudinal direction of the plate-link chain, and the rocker member contact surfaces are provided on the upper and lower contact surface regions between rocker member and link plate, relative to the height direction of the rocker member, whereby the opening in the link plate has at least one region that is curved in an inward direction.

In other words, the invention therefore provides a plate-link chain that has link plates in which the opening for receiving a pair of rocker members has at least one region that narrows the opening by an inwardly curved region. Thus, insertion of the rocker members into the opening is only possible when the rocker members are oriented in the proper position in relation to each other, and when the rocker members are oriented incorrectly relative to each other an overlapping of the inwardly curved region by at least one of the rocker members occurs, and hence the rocker member cannot be inserted into the opening.

In accordance with the invention, arranging of the rocker members in the opening is therefore only possible when the rocker members are positioned in relation to each other as intended.

At the same time, the invention provides that, viewed from inside the opening looking outward, the inwardly curved region is a projection extending convexly away from a concave peripheral edge of the opening. The projection extends far enough inward from the convex peripheral edge in the direction of the opening so that insertion of the rocker members into the opening is only possible when the rocker members are positioned in relation to each other as intended. Otherwise the rocker members, or at least one of the rocker members, cannot be inserted into the opening, so that incorrect installation of the rocker members in terms of the positions of the rocker members relative to each other and to the link plates is not possible.

On a back surface opposite the rolling surfaces the asymmetrical rocker members have a relief cut, which can be used in an advantageous manner to establish fabrication tolerances when producing the rocker members. At the same time, the invention provides that the inwardly-curved region of the link plate is positioned at a region of the peripheral edge of the link plate opening that is substantially opposite the relief cut when the rocker member is positioned in the opening as intended, i.e., that the projection on the link plate opening that extends convexly away from the concave peripheral edge of the opening is intended so that it lies opposite the relief cut of the rocker members. That also advantageously achieves the result that the inwardly curved region uses the space that is available because of the relief cut, and since that relief cut of the rocker members is in the lower part of the rocker members, viewed in the extended direction of the plate-link chain. The inwardly curved region of the link plate can also be provided in the lower part of the link plate openings, i.e., in a region that is problematic in the known plate-link chains in regard to the concentration of stresses, so that because of the inwardly curved region an enlargement of the cross-sectional area of the link plate available for transmitting power is achieved, and thus stress on the material in the link plate decreases at a given power level.

The invention also provides a link plate for a plate-link chain as described above, with two openings for receiving two pairs of rocker members. The link plate in accordance with the invention is further constructed in such a way that each opening includes a region that extends in an inward direction from the peripheral edge of the opening. That region extending in an inward direction is advantageously formed at a location that lies opposite the location of the relief cut of the rocker members that are to be installed.

The link plate is therefore provided with an opening region whose form and surface are substantially complementary to a relief cut formed on a back surface of a rocker member, and which extends far enough into the opening that an overlapping of the region with rocker members occurs when the rocker members are oriented with an alignment that deviates from an intended orientation relative to the opening. Mounting or inserting the rocker members into the opening is therefore only possible when the rocker members are oriented as intended relative to the opening in the link plate, and therefore only with simultaneous alignment of the rocker members relative to each other as intended, and not with an incorrect orientation.

BRIEF DESCRIPTION OF THE DRAWINGS

The structure, operation, and advantages of the present invention will become further apparent upon consideration of the following description, taken in conjunction with the accompanying drawings in which:

FIG. 2a is a fragmentary side view of a portion of a link plate in accordance with the invention and having a modified opening; and FIG. 2b is a view similar to FIG. 2a, which shows a preventable incorrect installation situation.

DESCRIPTION OF THE PREFERRED EMBODIMENTS

Figure 1A:
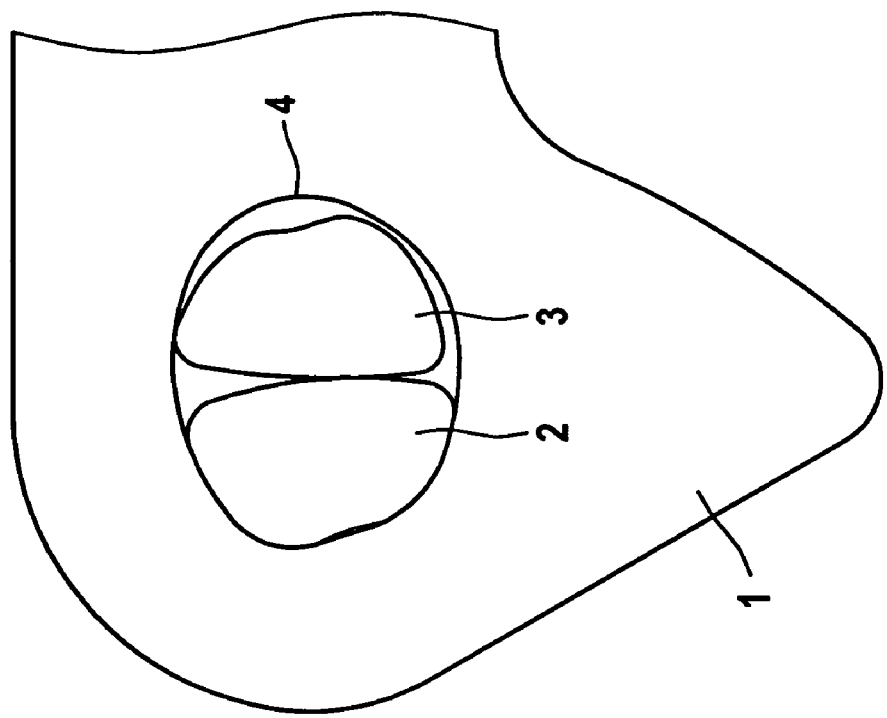
FIG. 1a is a fragmentary side view of a portion of a link plate with a pair of rocker members positioned in an opening, wherein the opening allows an incorrectly oriented installation situation of the two rocker members.

The link plate portions shown in the drawing are in each case portions of a link plate that is intended for forming a toothed chain.

Referring first to FIG. 1a, there is shown a link plate 1, which when placed one on top of another leads to a plate link set that can be used to make a toothed chain. For that purpose, a rocker member pair composed of asymmetrical rocker members 2, 3 is inserted into an opening 4 of link plate 1. In the example shown, rocker member 2 is a so-called fixed rocker member, since it is wedged tight with an adjacent inner link plate and an adjacent outer link plate, viewed perpendicular to the drawing plane, which establish a stack of link plates 1 between them. Rocker member 3 is a free rocker member, of shorter design than rocker member 2, which is not wedged with the inner and outer link plates, as is the case with rocker member 2, and has a rolling surface 5 that can roll on a rolling surface 6 of rocker member 2.

An upper contact surface 7 and a lower contact surface 8 are provided in the region of opening 4 on link plate 1, which surfaces interact with an upper contact surface 9 and a lower contact surface 10, respectively, of rocker member 3 to transmit power. The space between the upper and lower contact surfaces shown in FIG. 1a is shown enlarged to illustrate the respective contact surfaces.

FIG. 1a of the drawing shows a correctly positioned installation situation of rocker members 2, 3 in opening 4 as intended, such that the respective wider regions of the asymmetrical rocker members 2, 3, shown in the width direction (double arrow B), are positioned lying opposite each other.

Figure 1B:
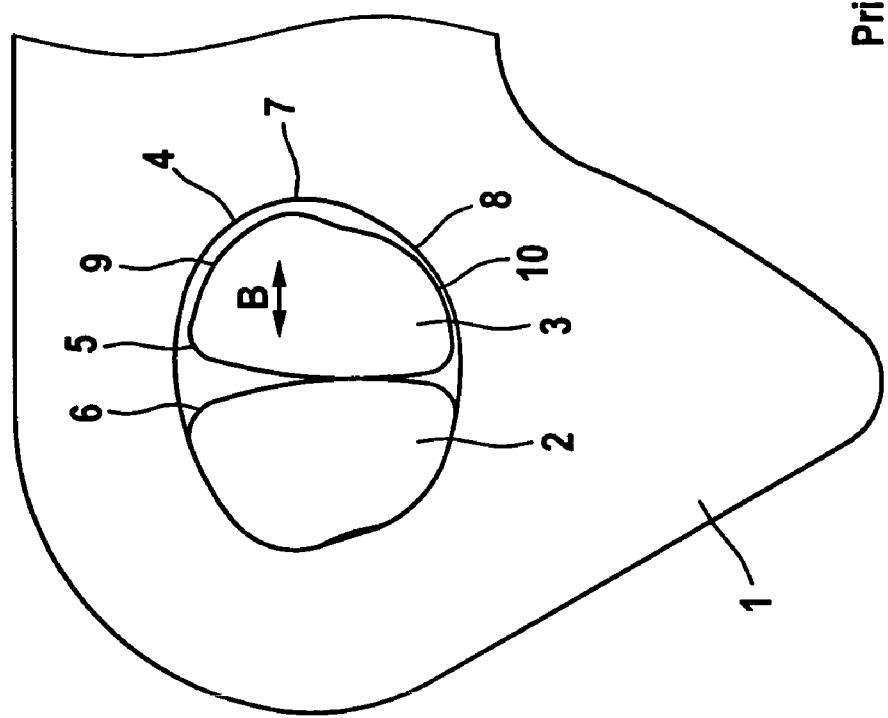
FIG. 1b is a view similar to FIG. 1a, in which the right-hand rocker member in the drawing plane is incorrectly installed relative to the left-hand rocker member.

However, because of the configuration of opening 4, an incorrect installation situation of rocker members 2, 3 in opening 4 that deviates from the intended installation situation is also possible, as is shown in FIG. 1b.

The left-hand rocker member 2 in FIG. 1b of the drawing is again correctly installed in opening 4. The rocker member 3 is incorrectly installed, because the wider region of rocker member 3 is no longer positioned opposite to the wider region of rocker member 2, but rather rocker member 3 is rotated by 180 degrees and is thus installed in opening 4 in an incorrect position. That incorrect installation situation can result in the occurrence of jamming of the rocker members in opening 4, and thus to a malfunction that can result in failure of the plate-link chain.

Now in order to eliminate the problem arising from the incorrect installation of the rocker members in opening 4, in accordance with the invention, and as shown in FIG. 2a, a link plate 11 is provided with an opening 12 that has a region 13 that is curved in an inward direction to provide an inwardly curved orientation region.

FIG. 2a of the drawing, shows a correctly positioned installation, and thus the orientation of the rocker members 2, 3 in opening 12 with respect to each other is as intended. Rocker members 2, 3 have a relief cut 15 formed on a back region 14 opposite rolling surfaces 5, 6, and which is positioned substantially opposite the inwardly curved region 13. Thus, when rocker members 2, 3 are positioned in opening 12 as intended, region 13 is located at a part of the peripheral edge 16 of opening 12 that lies substantially opposite relief cut 15.

FIG. 2b now shows the circumstances that would occur with an installation situation of the rocker members in opening 12 of the link plate 11 in accordance with the invention resulting from an incorrect orientation of rocker members 2, 3 with respect to each other. Rocker member 2 is again situated in opening 12 in the correct position. Because of an incorrect orientation of rocker member 3 due, for example, to incorrect transport by a vibrating conveyor used during assembly of the plate-link chain in accordance with the invention, an incorrect installation situation would arise as shown in FIG. 2b of the drawing. That incorrect installation can no longer occur with the plate-link chain in accordance with the invention, however, because between the inwardly directed region 13 of opening 12 and the incorrectly oriented rocker member 3 there is an overlap in the region of the inwardly directed curved region 13 (see arrow D in FIG. 2b), and therefore it is no longer possible to insert rocker member 3 into opening 12 of link plate 11. Thus an incorrect positioning of rocker members 2, 3 in the opening of the link plate is no longer possible, and accordingly the rocker members can now only be inserted into the opening positioned in the correct orientation.

An additional result of the inwardly curved region 13 is that the cross-sectional region of link plate 11 available for transmitting power (see cross-sectional region designated as "a" in FIG. 2a) is enlarged and thus the workpiece stresses in link plate 1 are reduced. If now region 13, viewed from a center point of opening 12, is placed at an angle of about 45 degrees to the horizontal line extending through the center point, the enlarged cross-sectional region then extends in a region of link plate 1 that is stress-critical with known link plate designs, so that the invention is also advantageous with regard to the concentration of stresses in that region.

Because of the cam-like design of opening 12 in the region 13 with the inwardly-directed curve, incorrectly oriented installation of a rocker member in the opening of the plate is no longer possible. The provision of the inwardly curved region in a region where there is otherwise minimal distance between the opening of the link plate and the outer peripheral edge of the link plate results in a reduction of the stresses in the part in that region, and thus leads to an increase in the load-bearing capability and the service life of the link plates, and thus of the entire plate-link chain.

Although particular embodiments of the present invention have been illustrated and described, it will be apparent to those skilled in the art that various changes and modifications can be made without departing from the spirit of the present invention. It is therefore intended to encompass within the appended claims all such changes and modifications that fall within the scope of the present invention.

What is claimed is:

1. A plate-link chain for a motor vehicle drive system, said chain comprising: a plurality of link plates hingedly connected with each other by rocker members, wherein the rocker members extend transversely to the longitudinal direction of the plate-link chain and are positioned in openings in the link plates, the link plates having a pair of spaced openings for receiving respective pairs of rocker members, wherein the rocker members and the link plate openings each include respective curved-shaped contact surfaces along which the rocker members and link plates are in contact with each other to transmit power, the rocker members having curved-shaped rolling surfaces on sides opposite to the rocker member contact surfaces and along which the rocker members roll against each other to transmit power, wherein the rocker members are shaped asymmetrically in a height direction of the rocker members relative to a transverse plane that divides the rocker members into upper and lower contact surface regions each having respective contact surfaces that contact respective opposed contact surfaces of the link plate openings, wherein the transverse plane passes through center points of the link plate openings to divide the openings into upper and lower opening regions and is parallel to a plane extending in the longitudinal direction of the plate-link chain, wherein the contact surfaces of the rocker members and of the link plate openings are provided at respective upper and lower contact surface regions relative to the height direction of the rocker members and relative to the transverse plane, wherein the asymmetrically-shaped rocker members have a width at the rocker member upper contact surface region that is wider than a rocker member width at the rocker member lower contact surface region, wherein a concave relief cut is positioned between the upper and lower contact regions of each of the rocker members and below the transverse plane, and wherein each of the link plate openings having an outer side adjacent to a respective longitudinally outer edge of the link plate and an inner side longitudinally opposite to and facing the respective outer side, the link plate openings each having on the inner side of each of the respective openings at least one rocker member orientation region that is convexly curved and that extends in an inward direction of the opening and is completely below the transverse plane and opposite to a respective rocker member relief cut to prevent incorrect installation of an asymmetrically shaped rocker member within a link plate opening.

2. A plate-link chain in accordance with claim 1, wherein the inwardly-curved orientation region extends into the link plate opening a distance sufficient to allow installation of the rocker members in a link plate opening in only a predetermined position relative to each other.

3. A plate-link chain in accordance with claim 1, wherein the inwardly-curved orientation region is a projection that extends concavely away from a convex peripheral edge of the link plate opening.

4. A plate-link chain in accordance with claim 1, wherein the rocker members have a relief cut on a back surface lying opposite to the rolling surface, and the inwardly curved orientation region of the link plate opening is substantially opposite a rocker member relief cut when the rocker members are arranged in an intended relative position within the link plate opening.

5. A plate-link chain in accordance with claim 1, wherein the link plates include two openings to each receive two pairs of rocker members, wherein each link plate opening includes an inwardly-curved orientation region.

6. A plate-link chain in accordance with claim 5, wherein the inwardly-curved orientation region is substantially complementary in form and position relative to a relief cut provided on a back surface of the rocker members, wherein the back surface lies opposite to rocker member rolling surfaces, and wherein the inwardly-curved orientation region extends inward into the link plate opening a distance sufficient so that an overlap of the inwardly-curved orientation region with a portion of a rocker member occurs when the orientation of the rocker members relative to the opening deviates from an intended orientation.

7. A link plate for a plate-link chain, said link plate comprising: a plate member having an upper longitudinal surface and having two longitudinally spaced openings below the upper longitudinal surface to each receive a respective pair of rocker members, wherein relative to a longitudinally-extending plane extending in a longitudinal direction of the link plate and passing through a center of each of the link plate openings to divide the link plate openings into upper and lower link plate opening regions, each of the openings having an outer side adjacent to a respective longitudinally outer edge of the link plate and an inner side longitudinally opposite to and facing the respective outer side, wherein each link plate opening includes an inwardly-extending convex orientation region on its inner side for allowing installation in the respective link plate openings of asymmetrically-shaped rocker members in only a predetermined position relative to each other, and wherein the at least one inwardly-extending convex orientation region on the inner side of each opening is completely spaced below the longitudinally-extending plane that passes through the centers of each of the link plate openings.

8. A link plate in accordance with claim 7, wherein the inwardly curved orientation region is substantially complementary in form and position relative to a relief cut formed on a back surface of a rocker member, wherein the back surface lies opposite to a rocker member rolling surface against which an associated rocker member rolls, and wherein the inwardly curved orientation region extends inward into the opening a distance sufficient so that an overlap of the inwardly curved orientation region with a rocker member occurs when the orientation of the rocker member relative to the opening deviates from an intended orientation.

9. A plate-link chain in accordance with claim 7, wherein the chain when in use passes around driving and driven members, and the at least one inwardly curved orientation region on the inner side of the opening is positioned on a side of the longitudinally-extending plane that faces the driving and driven members.

10. A plate-link chain in accordance with claim 7, wherein the at least one orientation region is spaced from the longitudinally-extending plane that passes through the link plate openings.

11. A plate-link chain in accordance with claim 10, wherein the chain when in use passes around driving and driven members, and the at least one orientation region is positioned on a side of the longitudinally-extending plane that faces the driving and driven members.

* * * * *